US011611614B2

(12) United States Patent
Ahn et al.

(10) Patent No.: US 11,611,614 B2
(45) Date of Patent: Mar. 21, 2023

(54) METHOD AND APPARATUS FOR CONTROLLING PEER TO PEER CONNECTION

(71) Applicant: SAMSUNG SDS CO., LTD., Seoul (KR)

(72) Inventors: Ho Sung Ahn, Seoul (KR); Seo Young Lee, Seoul (KR); Hee Tae Yoon, Seoul (KR); Jun Ho Kang, Seoul (KR); Young Jin Kim, Seoul (KR); Sang Bum Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 17/506,968

(22) Filed: Oct. 21, 2021

(65) Prior Publication Data
US 2022/0131936 A1    Apr. 28, 2022

(30) Foreign Application Priority Data

Oct. 22, 2020    (KR) .......................... 10-2020-0137254

(51) Int. Cl.
*H04L 67/1042*    (2022.01)
*H04L 45/00*    (2022.01)

(52) U.S. Cl.
CPC .......... *H04L 67/1042* (2013.01); *H04L 45/22* (2013.01)

(58) Field of Classification Search
CPC ............................ H04L 67/1042; H04L 45/22
USPC ........................................................ 709/201
See application file for complete search history.

(56) References Cited

U.S. PATENT DOCUMENTS

| 8,514,718 | B2* | 8/2013 | Zijst ........................ H04L 47/11 |
| | | | 370/312 |
| 9,332,561 | B1* | 5/2016 | Khawam ............. H04L 65/1069 |
| 9,860,283 | B2* | 1/2018 | Munger .............. H04L 61/5092 |
| 10,142,391 | B1* | 11/2018 | Brisebois ............ H04L 41/5009 |
| 10,218,588 | B1* | 2/2019 | Brisebois ........... G06Q 10/1095 |
| 10,355,981 | B1* | 7/2019 | Matthews ............. H04L 45/302 |
| 10,666,323 | B1* | 5/2020 | Vannucci ................. H04B 3/32 |
| 2013/0283285 | A1 | 10/2013 | Zhou et al. |
| 2015/0067819 | A1* | 3/2015 | Shribman ............. H04L 67/567 |
| | | | 709/218 |
| 2015/0156085 | A1* | 6/2015 | Galanes ............. H04L 12/5691 |
| | | | 709/224 |

(Continued)

FOREIGN PATENT DOCUMENTS

CN    108881785 A    11/2018
JP    2009-212657 A    9/2009

(Continued)

*Primary Examiner* — Melvin H Pollack
(74) *Attorney, Agent, or Firm* — The PL Law Group, PLLC

(57) ABSTRACT

A method performed by a computing device for controlling a P2P connection according to an embodiment of the present disclosure includes obtaining network information of a current path for transmitting and receiving data, calculating requested data quality of the current path by using the network information, and changing a network path to an alternative path by using previously stored data quality history information of the alternative path when a difference between a predetermined highest data quality and the requested data quality of the current path is equal to or greater than a reference value.

18 Claims, 14 Drawing Sheets

(56) References Cited

U.S. PATENT DOCUMENTS

| | | | | |
|---|---|---|---|---|
| 2015/0215359 A1* | 7/2015 | Bao | ........................ | H04L 65/80 |
| | | | | 709/219 |
| 2015/0295808 A1* | 10/2015 | O'Malley | ............... | H04L 43/10 |
| | | | | 709/224 |
| 2016/0100324 A1* | 4/2016 | Henry | .................... | H04L 45/22 |
| | | | | 370/218 |
| 2016/0127808 A1* | 5/2016 | Wong | ................... | H04M 15/08 |
| | | | | 379/112.04 |
| 2016/0315808 A1* | 10/2016 | Saavedra | ................ | H04L 49/70 |
| 2016/0359943 A1* | 12/2016 | Huang | .................. | H04L 67/104 |
| 2018/0091417 A1* | 3/2018 | Oré | ..................... | H04L 63/0236 |
| 2019/0141193 A1* | 5/2019 | Lee | ..................... | H04L 65/1069 |
| 2019/0333059 A1* | 10/2019 | Fallah | .................. | G06Q 20/308 |
| 2019/0349426 A1* | 11/2019 | Smith | .................. | H04L 67/562 |
| 2020/0045519 A1* | 2/2020 | Raleigh | ................ | H04M 15/80 |
| 2020/0106696 A1* | 4/2020 | Michael | ............... | H04L 45/586 |
| 2020/0133257 A1* | 4/2020 | Cella | .................. | G05B 19/4185 |
| 2020/0412787 A1* | 12/2020 | Pichaimurthy | ....... | H04L 65/756 |
| 2021/0006490 A1* | 1/2021 | Michael | ............. | H04L 43/0864 |

FOREIGN PATENT DOCUMENTS

| | | | |
|---|---|---|---|
| JP | 2011-041153 A | 2/2011 |
| JP | 2018-011142 A | 1/2018 |
| KR | 10-2004-0096807 A | 11/2004 |
| KR | 10-2007-0028967 A | 3/2007 |

* cited by examiner

METHOD AND APPARATUS FOR CONTROLLING PEER TO PEER CONNECTION

CROSS REFERENCE TO RELATED APPLICATIONS AND CLAIM OF PRIORITY

This application claims the benefit of Korean Patent Application No. 10-2020-0137254, filed on Oct. 22, 2020, in the Korean Intellectual Property Office, the disclosure of which is incorporated herein by reference in its entirety.

BACKGROUND

1. Field

The present disclosure relates to a method and apparatus for controlling a peer to peer (P2P) connection. More particularly, it relates to a method and apparatus for dynamically changing a network path by analyzing the quality of data received through a currently connected network path.

2. Description of the Related Art

P2P means a two-way data transmission system of the terminal. That is, it refers to a data transmission system that connects a terminal to a terminal without a central server (e.g., a relay server). The P2P technology is a technology widely used as data transmission speed increases due to the development of internet technology.

In the prior art, when the available bandwidth of the network decreases, the quality of transmission and reception data is lowered, and when the available bandwidth of the network increases, the quality of transmission and reception data is improved. In this prior art, when the available bandwidth of the network continuously decreases, the quality of transmission and reception data also should be continuously lowered accordingly.

In particular, there is a problem in that when the available bandwidth of the network continuously decreases in the video conferencing service, to which the prior art is applied, only voice data is transmitted and received without transmitting and receiving video data.

SUMMARY

A technical problem to be solved by some embodiments of the present disclosure is to provide a method and apparatus for dynamically changing a network path, through which data is transmitted and received, according to a changed network environment.

Another technical problem to be solved by some embodiments of the present disclosure is to provide a method and an apparatus for determining a path, through which data of optimal quality can be transmitted and received.

Another technical problem to be solved by some embodiments of the present disclosure is to provide a method and apparatus for determining a path capable of transmitting and receiving data of better quality among a P2P path and a path via a server in transmitting and receiving data with a counterpart terminal.

Another technical problem to be solved by some embodiments of the present disclosure is to provide a method and an apparatus for calculating the quality of received data.

Another technical problem to be solved by some embodiments of the present disclosure is to provide a method and an apparatus for managing a quality history of received data.

The technical problems of the present disclosure are not limited to the technical problems mentioned above, and other technical problems not mentioned will be clearly understood by those skilled in the art from the description below.

According to a method performed by a computing device for controlling a P2P connection comprising, obtaining network information of a current path for transmitting and receiving data, calculating requested data quality of the current path by using the network information and changing a network path to an alternative path by using previously stored data quality history information of the alternative path when a difference between a predetermined highest data quality and the requested data quality of the current path is equal to or greater than a reference value.

According to an embodiment, wherein the data comprises video data of a user participating in a video conferencing service.

According to an embodiment, wherein the current path is any one of a P2P path and a path via a server, wherein the alternative path is the path via the server if the current path is the P2P path, and the alternative path is the P2P path if the current path is the path via the server.

According to an embodiment, wherein calculating the requested data quality of the current path comprises, calculating a packet loss rate and a delay time by using information on a packet included in the network information and calculating an available bandwidth of the current path by using the packet loss rate and the delay time.

According to an embodiment, wherein calculating the requested data quality of the current path comprises, updating the data quality history information of the current path by storing the calculated requested data quality of the current path to correspond to request time.

According to an embodiment, wherein changing the network path to the alternative path comprises, calculating the requested data quality of the alternative path by using network information of the alternative path when a difference between the predetermined highest data quality and the requested data quality of the current path is equal to or greater than a reference value and changing a network path to the alternative path when a difference between the requested data quality of the alternative path and the highest data quality is less than or equal to a reference value.

According to an embodiment, wherein changing a network path to the alternative path by using the previously stored data quality history information of the alternative path comprises, calculating requested data quality of the alternative path by using information on a verification packet received through the alternative path at every predetermined period and updating the data quality history information of the alternative path by storing the calculated requested data quality of the alternative path to correspond to request time.

According to an embodiment, wherein calculating the requested data quality of the alternative path comprises, calculating a packet loss rate and a delay time by using information on the verification packet and calculating an available bandwidth of the alternative path by using the packet loss rate and the delay time.

According to an embodiment, wherein changing a network path to the alternative path by using the previously stored data quality history information of the alternative path comprises, changing a network path to the alternative path when the requested data quality of the alternative path included in the data quality history information of the alternative path is higher than the requested data quality of the current path.

According to an embodiment, wherein changing a network path to the alternative path by using the previously stored data quality history information of the alternative path comprises, calculating requested data quality of the alternative path by using information on a verification packet received in real time through the alternative path when the data quality history information of the alternative path does not exist and changing a network path to the alternative path when the requested data quality of the alternative path is higher than the requested data quality of the current path.

According to an embodiment, wherein changing a network path to the alternative path by using the previously stored data quality history information of the alternative path comprises, calculating requested data quality of the alternative path by using information on a verification packet received in real time through the alternative path when the data quality history information of the alternative path is information that has elapsed more than a reference time and changing a network path to the alternative path when the requested data quality of the alternative path is higher than the requested data quality of the current path.

According to another aspect of the present disclosure, an apparatus for controlling a P2P connection comprises, a processor, a network interface, a memory and a computer program loaded into the memory and executed by the processor, wherein the computer program comprises, an instruction for obtaining network information of a current path for transmitting and receiving data, an instruction for calculating requested data quality of the current path by using the network information and an instruction for changing a network path to an alternative path by using previously stored data quality history information of the alternative path when a difference between predetermined highest data quality and the requested data quality of the current path is equal to or greater than a reference value.

According to another aspect of the present disclosure, an apparatus for controlling a P2P connection comprises, a first network measurement module for collecting network information of a P2P path to a P2P connectable counterpart terminal, a second network measurement module for collecting network information of a path via a server, a data quality management module for calculating and storing data quality of the P2P path and the path via the server by using network information obtained by the first network measurement module and the second network measurement module and a transmission path management module for determining a path for transmitting and receiving data by using data quality history information stored in the data quality management module, wherein the transmission path management module determines a network path as an alternative path by using requested data quality of the alternative path included in the data quality history information when a difference between requested data quality of the current path included in the data quality history information and predetermined highest data quality is equal to or greater than a reference value.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
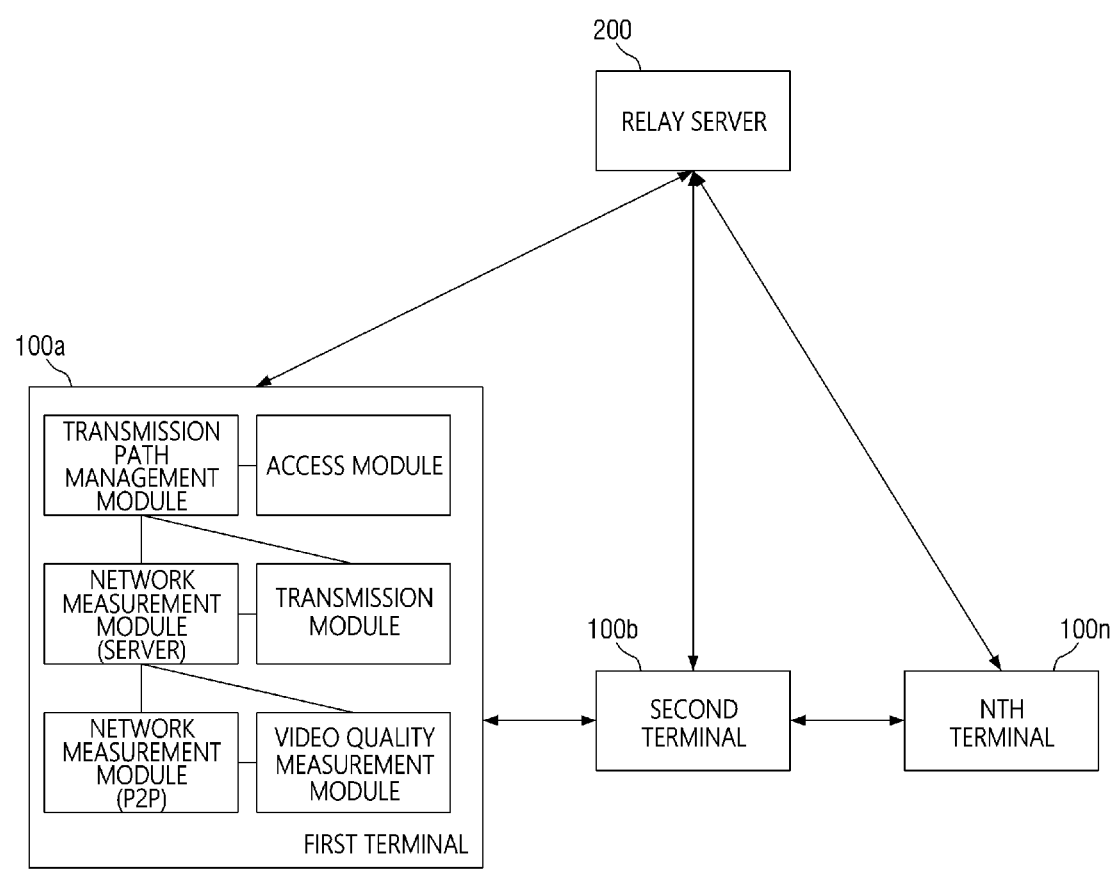
FIG. 1 is a diagram for describing a P2P connection control system according to an embodiment of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present inventive concept, when it is determined that the detailed description of the related well-known configuration or function may obscure the gist of the present inventive concept, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present inventive concept will be described in detail with reference to the accompanying drawings.

FIG. 1 is a diagram for describing a P2P connection control system according to an embodiment of the present disclosure.

Referring to FIG. 1, the P2P connection control system may include a first terminal 100a, a second terminal 100b, a nth terminal 100n, and a relay server 200. Each of the components of the P2P connection control system disclosed in FIG. 1 represents functional components that are functionally separated, and any one or more components may be implemented by being integrated with each other in an actual physical environment. Hereinafter, the components of the P2P connection control system will be described in more detail.

The first terminal 100a may transmit and receive data to and from another counterpart terminal connected to the network. In this case, the first terminal 100a may be connected to the counterpart terminal through P2P to transmit and receive data. Also, the first terminal 100a may transmit and receive data via the relay server 200. For a detailed description related thereto, it will be described below with reference to FIGS. 2 and 3.

Figure 2:
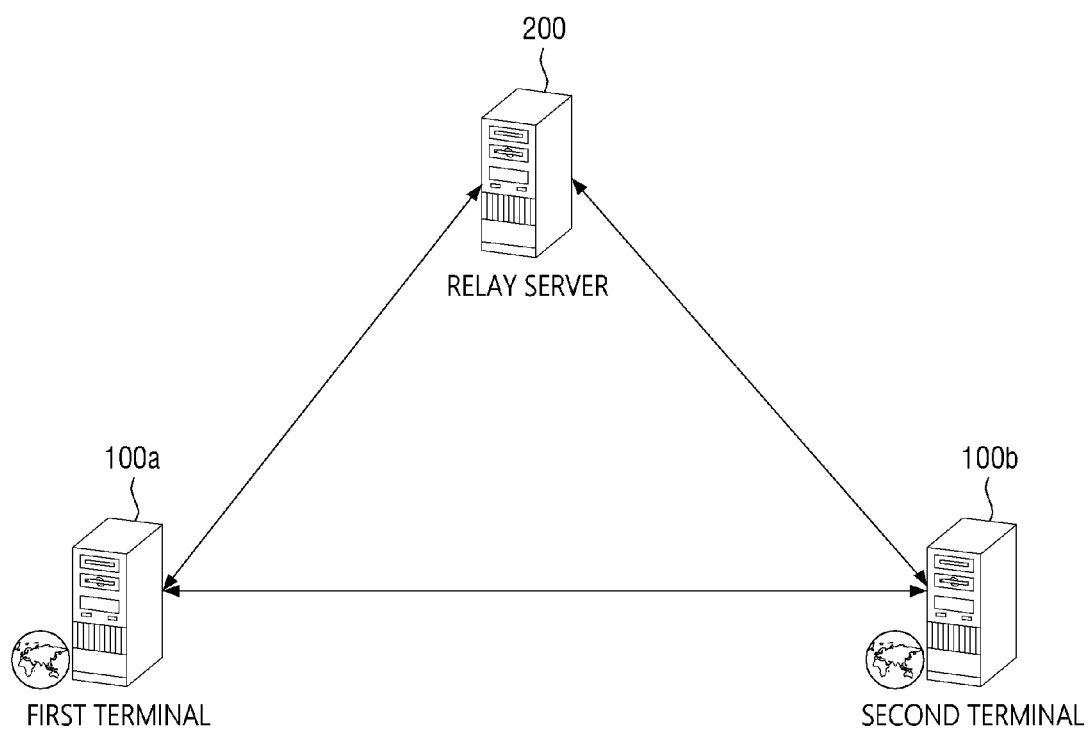
FIGS. 2 and 3 are diagrams for describing in more detail some configurations of the P2P connection control system described with reference to FIG. 1.
Figure 3:
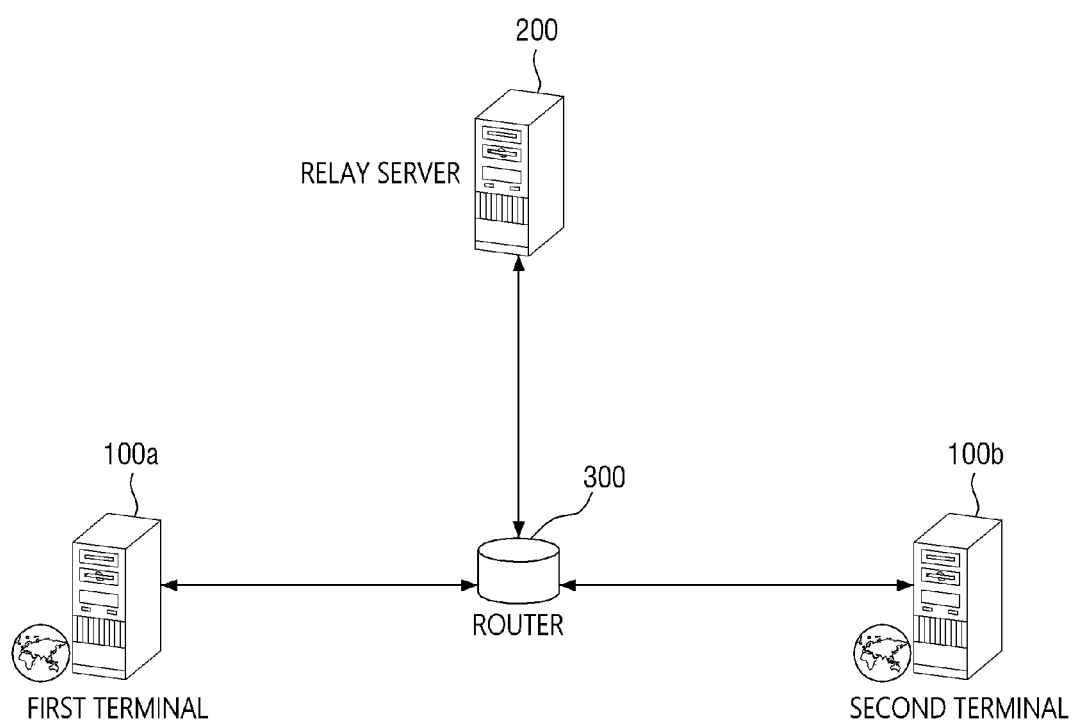

FIGS. 2 and 3 are diagrams for describing in more detail some configurations of the P2P connection control system described with reference to FIG. 1.

Referring to FIG. 2, an example of a network path for a first terminal 100a to transmit and receive data to and from a second terminal 100b is illustrated. Here, the P2P path, in which the first terminal 100a is directly connected to the second terminal 100b, and the path via the server, in which the first terminal 100a is connected to the second terminal 100b via the relay server 200, can be seen. In this case, the first terminal 100a may transmit and receive data to and from the second terminal 100b through any one of the P2P path and the path via the server.

Referring to FIG. 3, another example of a network path for the first terminal 100a to transmit and receive data to and from the second terminal 100b is illustrated. Here, the router 300 is a device that delivers a data packet to the next device along a designated path, and is directly connected to the first terminal 100a, the second terminal 100b, and the relay server 200.

In this case, the first terminal 100a may transmit and receive data to and from the second terminal 100b through the P2P path. When the process, in which the first terminal 100a transmits data to the second terminal 100b through the P2P path, is described in more detail, the first terminal 100a transmits data to the router 300. Next, the router 300 transmits the data transmitted by the first terminal 100a to the second terminal 100b. A process, in which the first terminal 100a receives data from the second terminal 100b, may be easily understood from the example described in detail above.

Also, the first terminal 100a may transmit and receive data to and from the second terminal 100b through a path via a server. When the process, in which the first terminal 100a transmits data to the second terminal 100b through the path via the server, is described in more detail, the first terminal 100a transmits data to the router 300. Next, the router 300 transmits the data transmitted by the first terminal 100a to the relay server 200. Next, the relay server 200 transmits data to the router 300, and the router 300 transmits data to the second terminal 100b. A process, in which the first terminal 100a receives data from the second terminal 100b, may be easily understood from the example described in detail above.

With reference to FIGS. 2 and 3 above, examples of a network path for the first terminal 100a to transmit and receive data to and from the second terminal 100b have been described. However, the present disclosure is not limited to these examples, and various networks including the first terminal 100a, the second terminal 100b and the relay server 200 may be included in the present disclosure. As described in FIGS. 2 and 3, this network may include a path via a server, through which the first terminal 100a transmits and receives data to and from the second terminal 100b via the relay server 200, and a P2P path, through which the first terminal 100a transmits and receives data to and from the second terminal 100b without via the relay server 200. It will be described again with reference to FIG. 1.

As described above, the first terminal 100a may transmit and receive data to and from another counterpart terminal connected to the network. In some embodiments, the data transmitted and received from the first terminal 100a may include video data of a user participating in a video conferencing service. In this case, the data transmitted and received from the first terminal 100a may include voice data of a user participating in the video conferencing service and data related to material attached by a user participating in the video conferencing service. That is, the video conferencing service can be provided to a user by applying the P2P connection control system according to the present embodiment.

Hereinafter, the configuration of the first terminal 100a will be described in more detail.

The first terminal 100a may include a network measurement module (P2P), a network measurement module (server), a data (e.g. video data) quality management module, a transmission path management module, an access module, and a transmission module.

The network measurement module (P2P) is a module for collecting network information of a P2P path to a counterpart terminal capable of P2P connection. Here, the network information may include information about a packet received by the first terminal 100a through the P2P path. A specific method of calculating the quality of a network path by using the packet-related information will be specified through description of the following specification.

In some embodiments related to the network measurement module (P2P), a plurality of network measurement modules (P2P) may be generated as many as the number of counterpart terminals connected through P2P. Here, the generated individual network measurement module (P2P) may collect network information of a P2P path to the corresponding counterpart terminal for each network measurement module (P2P). However, the present disclosure is not limited to the described example, and a single network measurement module (P2P) may collect network information of a plurality of P2P paths connected to a plurality of counterpart terminals.

Also, in some other embodiments related to the network measurement module (P2P), the network measurement module (P2P) may collect network information at every predetermined first period. Here, as the first period becomes shorter, the real-time of the network information collected through the P2P path is guaranteed, so the real-time of the data quality calculated using the network information can also be guaranteed. On the other hand, if the first period becomes longer, the computing load may be lowered.

Next, the network measurement module (server) is a module that collects network information of a path via a server. Here, the network information may include information about a packet received by the first terminal 100*a* through the path via the server. A specific method of calculating the quality of a network path by using the packet-related information will be specified through description of the following specification.

In some embodiments related to the network measurement module (server), the network measurement module (server) may collect network information at every predetermined second period. Here, as the second period becomes shorter, the real-time of the network information collected through the path via the server is guaranteed, so the real-time of the data quality calculated using the network information can also be guaranteed. On the other hand, if the second period becomes longer, the computing load may be lowered.

Network information of the first terminal 100*a* may be collected by the network measurement module (P2P) and the network measurement module (server) described above. As described with reference to FIGS. 2 and 3, the first terminal 100*a* may transmit and receive data to and from another counterpart terminal through a P2P path or a path via a server in order to transmit and receive data to and from another counterpart terminal.

Accordingly, when the current path, which is a network path for currently transmitting and receiving data, is a P2P path, an alternative path for replacing the current path may be a path via a server. Conversely, when the current path is a path via a server, the alternative path may be a P2P path. In this case, the first terminal 100*a* transmits and receives data to and from the counterpart terminal through the current path, and the first terminal 100*a* transmits and receives a verification packet through the alternative path. Since the first terminal 100*a* transmits and receives the verification packet through the alternative path, it is possible to determine whether the network connection is valid even though data is not transmitted and received with the counterpart terminal through the alternative path. In addition, it is possible to calculate the quality of data transmitted and received through the alternative path.

In some embodiments related thereto, if the current path is a P2P path, the first period for the network measurement module (P2P) to collect network information of the P2P path, which is the current path, may be determined to be shorter than the second period for the network measurement module (server) to collect network information of the path via the server, which is the alternative path. In addition, if the current path is a path via a server, the first period for the network measurement module (P2P) to collect network information of the P2P path, which is the alternative path, may be determined to be longer than the second period for the network measurement module (server) to collect network information of the path via the server, which is the current path. That is, the period for collecting network information on the current path may be determined to be shorter than the period for collecting network information on the alternative path. According to the present embodiment, the real-time of network information on the current path is guaranteed, and at the same time, it is possible to lower the computing load that may be generated from the collection of network information on the alternative path.

Next, the data quality management module is a module for calculating the data quality of the P2P path and the path via the server using the network information obtained by the network measurement module. A more detailed description of calculating the data quality of the network path using the network information will be described later.

In addition, the data quality management module is a module for storing the calculated data quality of the P2P path and the calculated data quality of the path via the server. Here, the data quality management module may store the calculated data quality of the network path to correspond to the request time. As such, the set of data quality of the network path stored to correspond to the request time is data quality history information. With reference to such data quality history information, a network path may be determined.

Next, the transmission path management module is a module for determining a path, through which data is transmitted and received, by using the data quality history information stored in the data quality management module. The transmission path management module may change a path, through which data is transmitted and received, according to a network path change criterion to be specified through the description of the specification later.

Next, the access module is a module for accessing to another counterpart terminal or relay server 200 connected to the network. In addition, the transmission module is a module for transmitting data thorough the network path determined or changed in the transmission path management module.

A network path for the first terminal 100*a* to transmit and receive data to and from another counterpart terminal connected to the network may be determined by the plurality of modules constituting the first terminal 100*a* described above. Here, the first terminal 100*a* may calculate the data quality of each path by using network information collected through a P2P path or a path via a server. Also, the first terminal 100*a* may use the calculated data quality of each path to change the network path according to a change criterion to be specified later.

Although the module included in the first terminal 100*a* has been described above, the second terminal 100*b* and the n-th terminal 100*n* shown in this figure may also include the same module as the first terminal 100*a*. In addition, in this figure, only the first terminal 100*a,* the second terminal 100*b,* and the n-th terminal 100*n* are shown as the terminal, but the present disclosure is not limited to the number of terminals illustrated in this figure, and a plurality of terminals may be included in the present disclosure. The more specific details related to the terminal will be specified through the description of the specification later.

Next, the relay server 200 is a server that transmits data to a plurality of clients (e.g. terminals). In situations such as when the P2P connection between terminals is impossible or the P2P connection between terminals is interrupted, the relay server 300 may transmit data to the terminal.

As described above, according to the P2P connection control system according to the present embodiment described with reference to FIGS. 1 to 3, a path capable of providing high quality data may be determined based on the data quality of the network path. Hereinafter, with reference to FIG. 4, a P2P access method of the first terminal 100*a* and the second terminal 100*b* connected to the network will be described in more detail.

Figure 4:
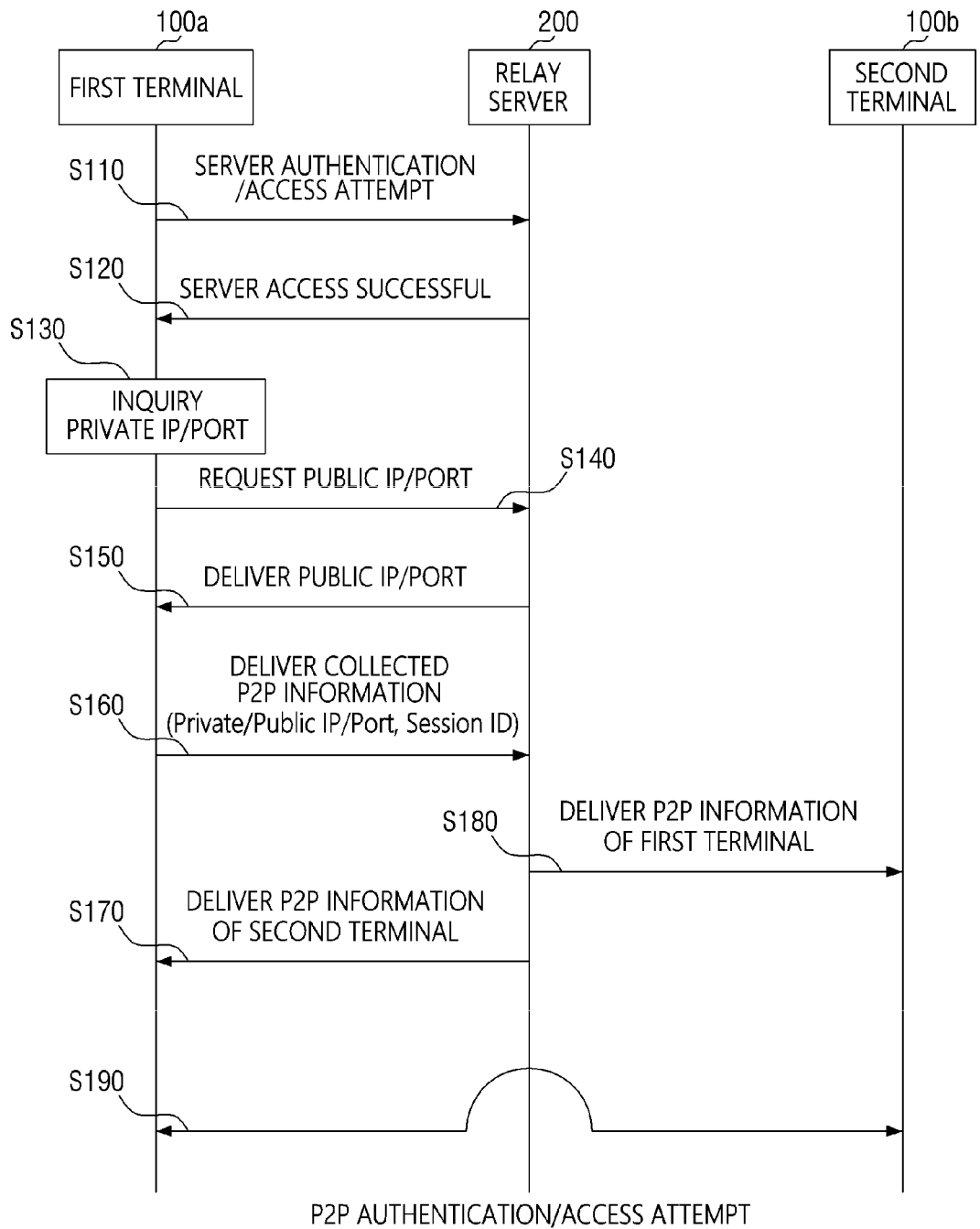
FIG. 4 is a flowchart for describing a P2P access method between terminals that may be referenced in some embodiments.

FIG. 4 is a flowchart for describing a P2P access method between terminals that may be referenced in some embodiments. The P2P connection method according to the present embodiment may be performed by a computing device. Also, the method according to the present embodiment may be separately performed by the first computing device and the second computing device. Hereinafter, in performing each operation of the method according to the present embodiment, if the description of the subject is omitted, the subject may be interpreted as the computing device.

Referring to FIG. 4, the first terminal 100a attempts authentication and access to the relay server 200 (S110), and the relay server 200 transmits the access approval information to the first terminal 100a based on the authentication information received from the first terminal 100a (S120). The first terminal 100a inquires and collects private IP information (S130). In addition, the first terminal 100a requests the public IP information inquiry to the relay server 200 (S140), and the relay server 200 transmits the inquired public IP information to the first terminal 100a (S150).

Next, the first terminal 100a transmits the collected network information for P2P connection to the relay server 200 (S160). Here, the network information may include private IP information, public IP information, and SSID information.

Similar to the method, in which the first terminal 100a transmits network information to the relay server 200 for P2P connection described above through steps S110 to S160, the network information of the second terminal 100b may be transmitted to the relay server 200.

Next, the relay server 200 transmits the network information for the P2P connection of the second terminal 100b to the first terminal 100a (S170), and the relay server 200 transmits the network information for P2P connection of the first terminal 100a to the second terminal 100b (S180).

Next, the first terminal 100a and the second terminal 100b attempt a P2P connection using the network information of the counterpart terminal (S190).

As described above, the first terminal 100a and the second terminal 100b may be connected through P2P by the P2P access method described with reference to FIG. 4. Hereinafter, a P2P connection control method according to another embodiment of the present disclosure will be described with reference to FIGS. 5 to 14.

Figure 5:
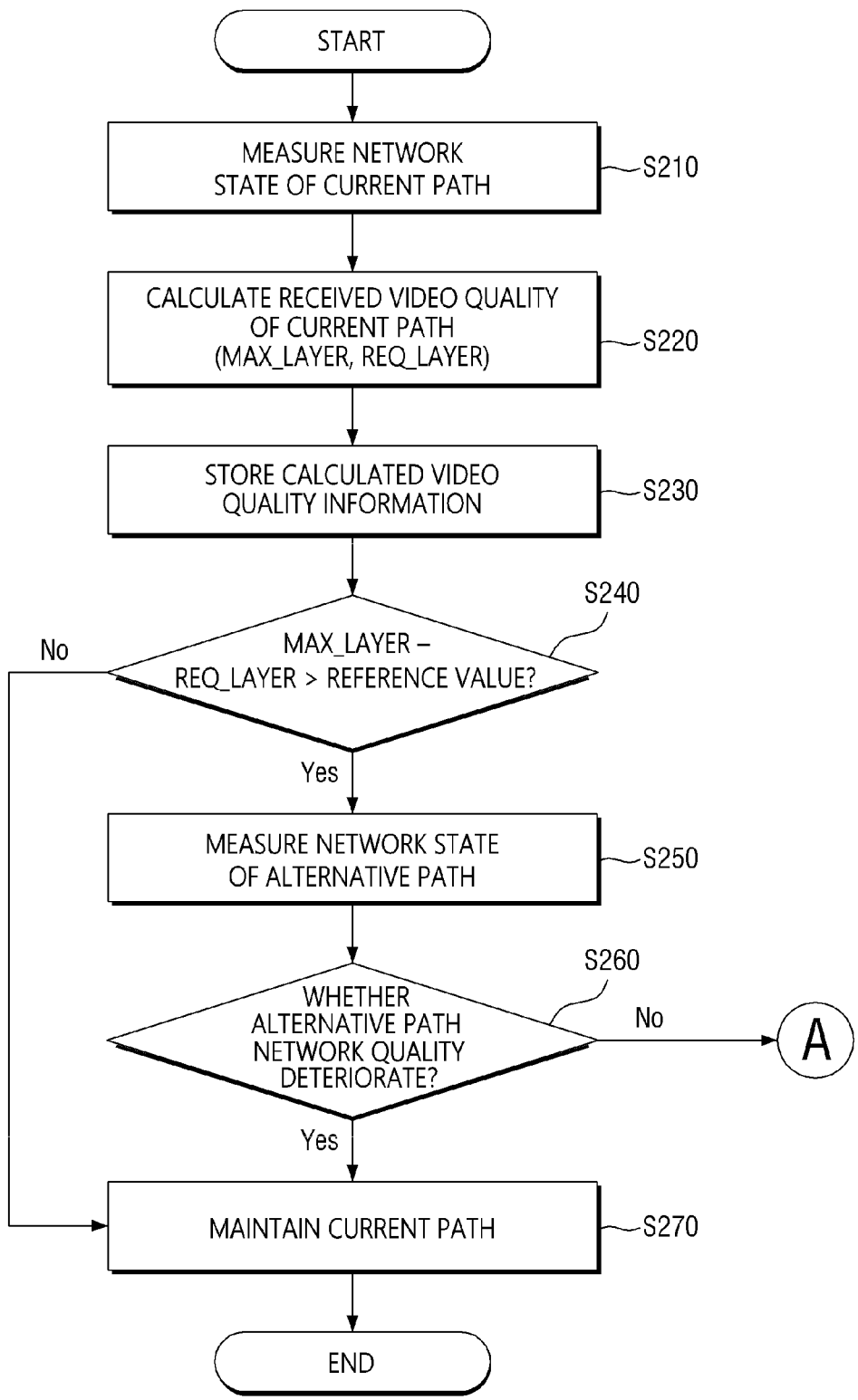
FIGS. 5 and 6 are flowcharts for describing a P2P connection control method according to another embodiment of the present disclosure.
Figure 6:
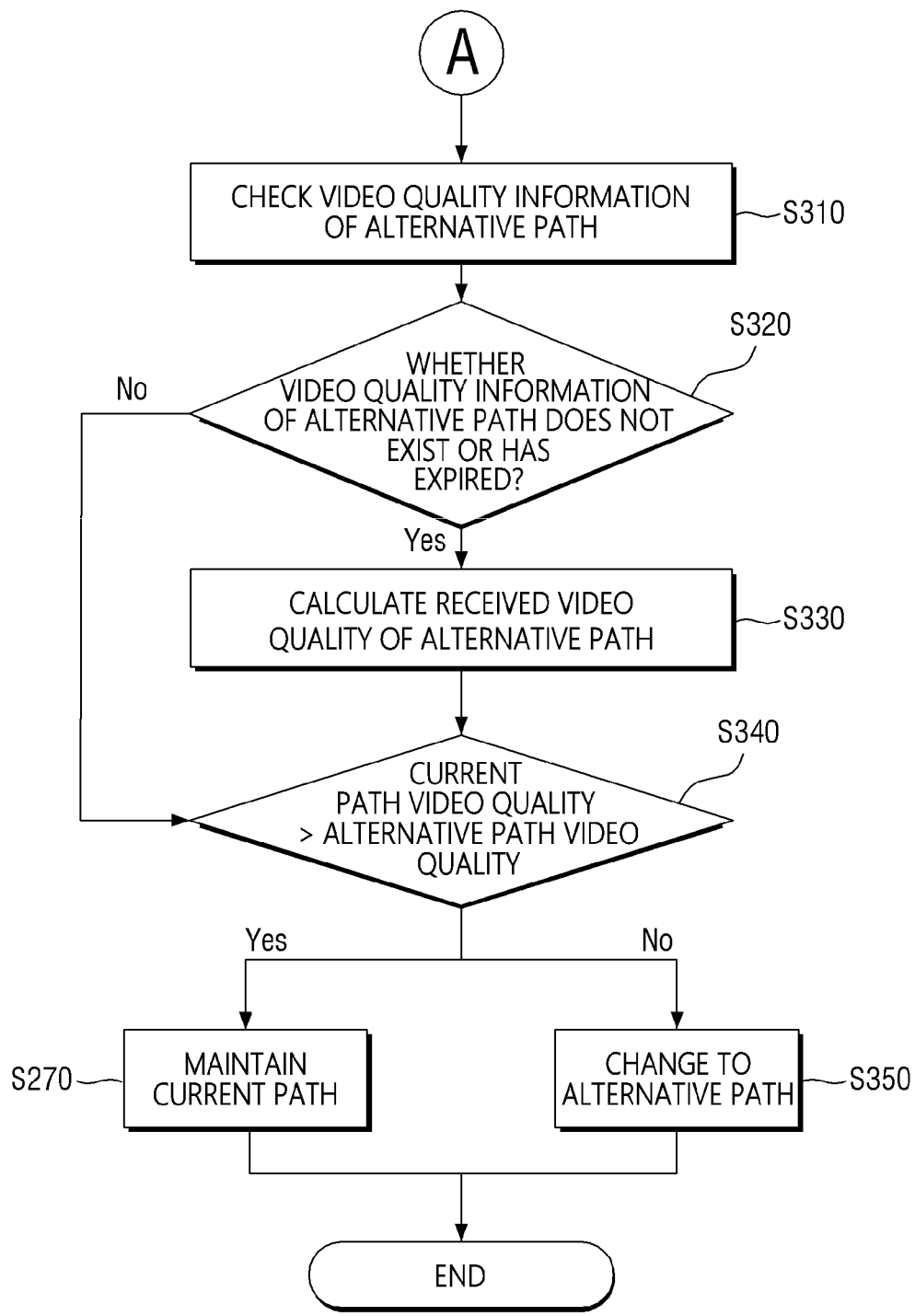

FIGS. 5 and 6 are flowcharts for describing a P2P connection control method according to another embodiment of the present disclosure. The P2P connection control method according to the present embodiment may be performed by a computing device. Also, the method according to the present embodiment may be separately performed by the first computing device and the second computing device. Hereinafter, in performing each operation of the method according to the present embodiment, if the description of the subject is omitted, the subject may be interpreted as the computing device.

Referring to FIG. 5, in step S210, the network state of the current path is measured. By this step, the network information of the current path may be obtained. As described above, the network information may include information regarding received data packets.

Next, in step S220, the quality of data received through the current path is calculated. Here, the data quality may include the highest data quality (MAX_LAYER) and the requested data quality (REQ_LAYER). In this case, the highest data quality means data quality predetermined by the user. The highest data quality means the data quality that the user wants to receive. In this case, the requested data quality means data quality calculated using network information of a network path. The requested data quality refers to a value corresponding to the available bandwidth of a network path calculated using information on data packets included in network information.

In some embodiments, the requested data quality may be represented as a layer value determined to correspond to an available bandwidth of a network path. Hereinafter, an operation of calculating the requested data quality of a network path will be described in more detail with reference to FIG. 7.

Figure 7:
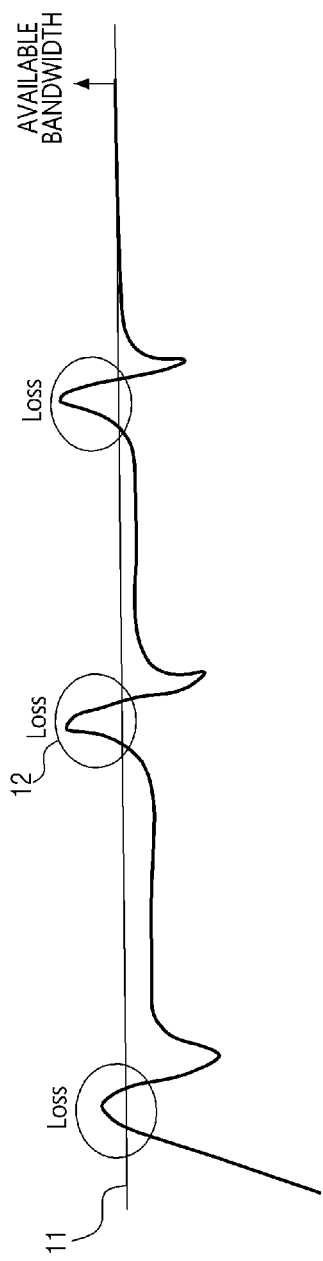
FIG. 7 is a diagram for describing in more detail a data quality calculation operation of the P2P connection control method described with reference to FIGS. 5 and 6.

FIG. 7 is a diagram for describing in more detail a data quality calculation operation of the P2P connection control method described with reference to FIGS. 5 and 6.

The graph shown in FIG. 7 shows the number of data packets transmitted per hour through a network path. Referring to FIG. 7, the packet at the upper end of the available bandwidth 11 is lost at the receiving terminal 12, and only the packet at the lower end of the available bandwidth 11 is received by the receiving terminal. As such, a packet that can be received by the receiving terminal is determined by the available bandwidth 11. The available bandwidth 11 may be calculated using a packet loss rate and a delay time. Hereinafter, it will be described in more detail.

When the sending terminal transmits a packet including the sequentially increasing sequence number, the packet loss rate can be calculated using the total number of received packets, the sequence number of the first received packet, and the sequence number of the last received packet in the receiving terminal. For example, if the sequence number of the first received packet is 1, the sequence number of the last received packet is 100, and the total number of received packets is 50, it can be seen that 50 packets are lost. In this case, the packet loss rate is calculated as 50%.

When the sending terminal transmits a packet including the transmission time, the delay time can be calculated using the arrival time and transmission time in the receiving terminal. For example, if each packet transmitted at 0 ms and 100 ms by the sending terminal arrives at 200 ms and 350 ms at the receiving terminal, the delay time of 50 ms is calculated between the receiving terminal and the sending terminal.

Using the packet loss rate and delay time described above, the available bandwidth of the network path may be calculated. Any known method of calculating an available bandwidth of a network path using a packet loss rate and a delay time may be applied to the present disclosure. It will be described again with reference to FIG. 5.

Next, in step S230, the calculated requested data quality is stored.

In some embodiments related to step S230, the calculated requested data quality of the current path may be stored to correspond to the request time, and data quality history information of the current path may be updated. According to the present embodiment, information on the quality of data transmitted and received through the current path may be recorded and managed to correspond to the request time. For a more detailed description related thereto, it will be described with reference to FIG. 8.

Figure 8:
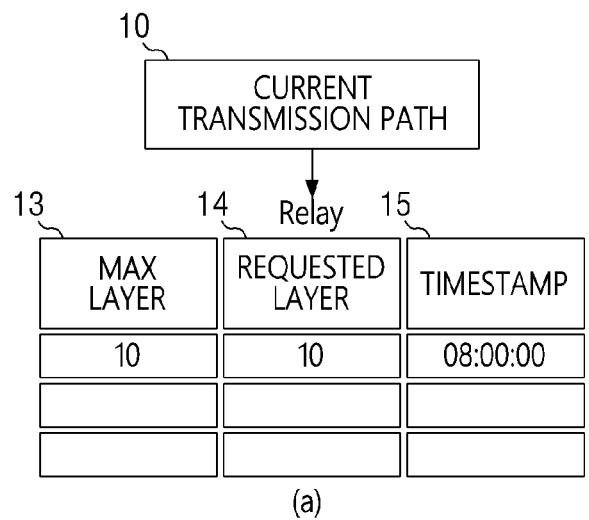
FIG. 8 is a diagram for describing in more detail a data quality storage operation of the P2P connection control method described with reference to FIGS. 5 and 6.
Figure 8:
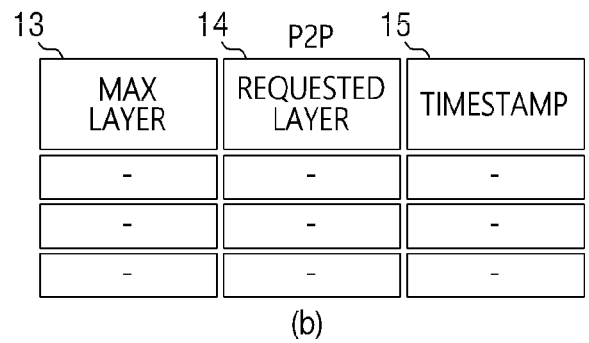

FIG. 8 is a diagram for describing in more detail a data quality storage operation of the P2P connection control method described with reference to FIGS. 5 and 6.

Referring to (a) of FIG. 8, data quality history information of the path via the server, which is the current path 10, is shown. Referring to (b) of FIG. 8, data quality history information of the P2P path, which is the alternative path, is shown.

The data quality history information shown in (a) of FIG. 8 includes information on data quality that is newly calculated and stored when existing information on data quality does not exist. In the information about the stored data quality, the highest data quality 13 is 10, and the requested data quality 14 is also 10 at the request time 15 of 8:00:00. At this time, the highest data quality 13, which is the data quality predetermined by the user, and the requested data quality 14 calculated from the collected network information are the same.

In the data quality history information shown in (b) of FIG. 8, information on data quality does not exist. In some embodiments, when the current path 10 is changed to a P2P path, data is transmitted from the counterpart terminal, so that the quality history information may be updated. In addition, in some other embodiments, the quality history information may be updated by transmitting the verification packet from the counterpart terminal. It will be described again with reference to FIG. 5.

Next, when the difference between the highest data quality and the requested data quality of the current path is less than or equal to the reference value (S240), the current path is maintained in step S270. When the difference between the highest data quality predetermined by the user and the requested data quality calculated using the network information collected through the current path is less than or equal to the reference value, it is reasonable to maintain the current path.

On the other hand, when the difference between the highest data quality and the requested data quality of the current path is equal to or greater than the reference value (S240), the network state of the alternative path is measured in step S250. When the difference between the highest data quality predetermined by the user and the requested data quality calculated using the network information collected through the current path is equal to or greater than the reference value, steps for changing the network path may be performed.

In step S250, the operation of measuring the network state of the alternative path is the same as that in step S210, except that only the measurement target network path is different.

In some embodiments related to step S250, the network state of the alternative path may be measured in real time. In this case, the real-time network state of the alternative path may be measured using the information on the verification packet transmitted in real time from the counterpart terminal.

In some other embodiments related to step S250, the received data quality of the alternative path may be calculated in real time, and the calculated requested data quality may be stored. In this case, steps S220 and S230 described above may be referenced. The operations performed are the same as those in steps S220 and S230 described above, except that only the measurement target network path is different.

Figure 9:
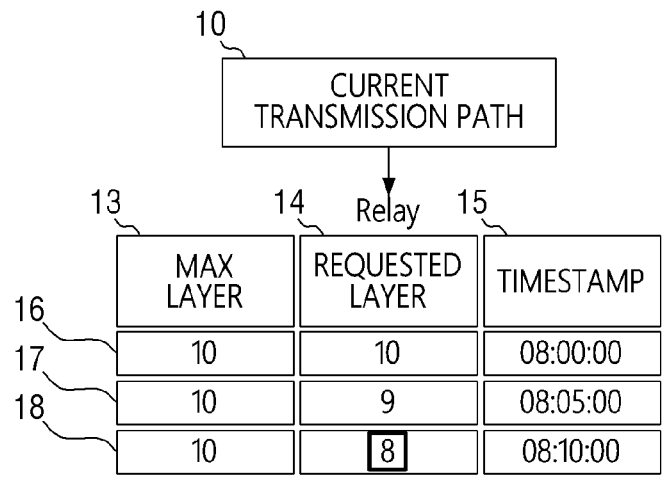
FIGS. 9 to 11 are diagrams for describing in more detail the network path change criteria of the P2P connection control method described with reference to FIGS. 5 and 6.

Hereinafter, step S240 will be described in more detail with reference to FIG. 9. FIG. 9 is a diagram for describing in more detail a network path change criterion of the P2P connection control method described with reference to FIG. 5.

Referring to FIG. 9, the data quality history information, in which data is received from the counterpart terminal through the path via the server, which is the current path 10, is shown. In the first time received data quality information 16, the highest data quality 13 is 10 and the requested data quality 14 is also 10 at the request time 15 of 8:00:00. In the second time received data quality information 17, the highest data quality 13 is 10 and the requested data quality 14 is 9 at the request time 15 of 8:05:00. In the third time received data quality information 18, the highest data quality 13 is 10, and the requested data quality 14 is 8 at the request time 15 of 8:10:00.

For example, when the difference between the highest data quality 13 and the requested data quality 14 is 2 or more, the reference value may be preset so that steps for changing the network path are performed. In this case, the third time received data quality information 18 shown in FIG. 9 is a case where the difference between the highest data quality 13 and the requested data quality 14 is 2 or more, and steps for changing the network path are performed. It will be described again with reference to FIG. 5.

Next, in step S260, if the requested data quality deteriorates also in the alternative path, the current path is maintained in step S270. On the other hand, if the requested data quality of the alternative path does not deteriorate, in step S310 of FIG. 6, data quality history information of the alternative path is seen. For a detailed description related thereto, it will be described with reference to FIGS. 10 to 11.

Figure 10:
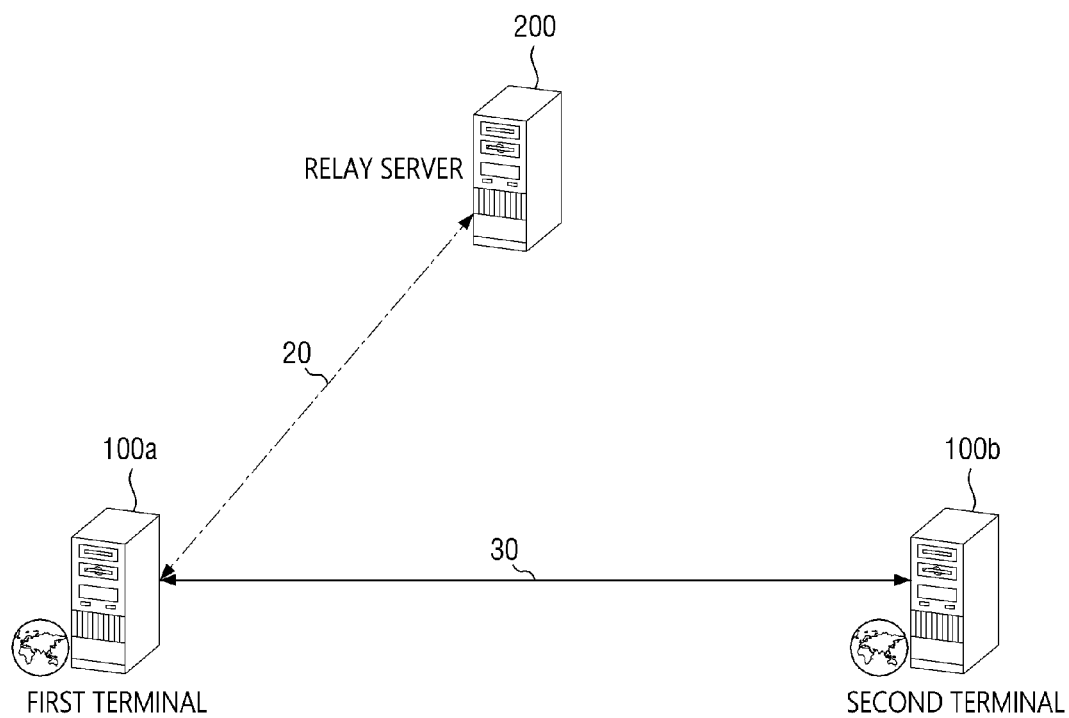
Figure 11:
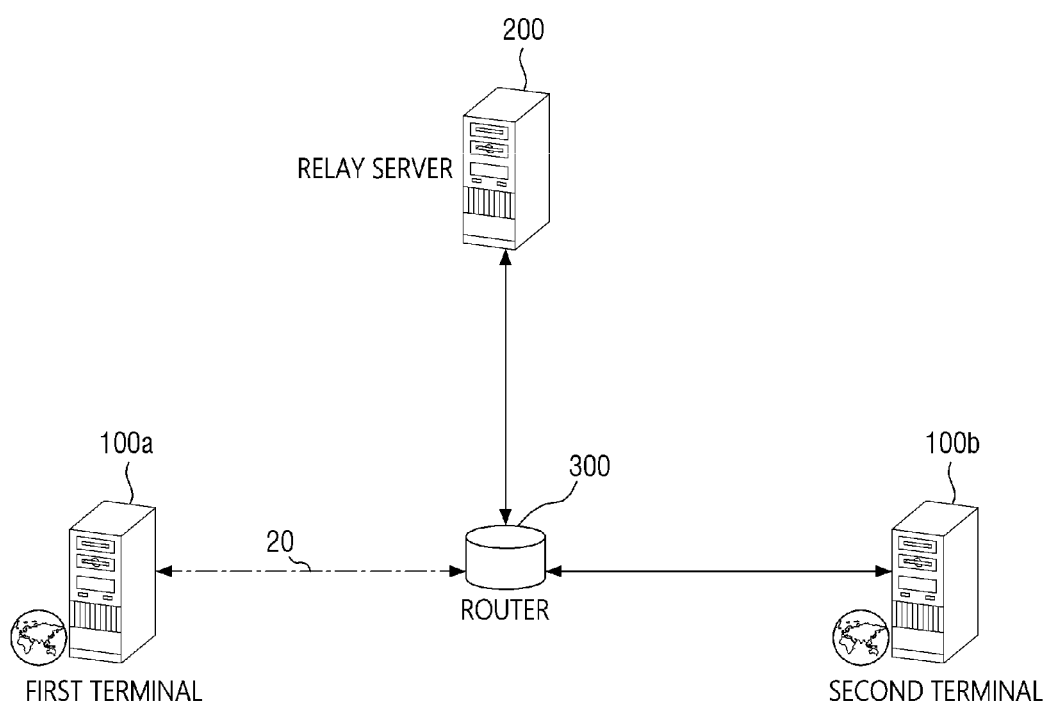

FIGS. 10 and 11 are diagrams for describing in more detail the network path change criteria of the P2P connection control method described with reference to FIGS. 5 and 6.

Referring to FIG. 10, the first terminal 100a transmits and receives data to and from the second terminal 100b via the relay server 200 through the path via the server, which is the current path. In this case, the path via the server, which is the current path, includes the path 20, in which the available network bandwidth is reduced, so that the requested data quality deteriorates. On the other hand, the P2P path, which is the alternative path, includes only the path 30, in which the available bandwidth is not reduced, so that the requested data quality does not deteriorate. As such, when the current path and the alternative path do not share the path 20 with reduced available network bandwidth, there is a possibility that transmitting and receiving data through the alternative path is likely to transmit data of improved quality, so steps for changing the network path are performed.

On the other hand, referring to FIG. 11, the first terminal 100a transmits and receives data to and from the second terminal 100b via the relay server 200 through the path via server, which is the current path. In this case, the path via the server, which is the current path, includes the path 20 with reduced available bandwidth, so that the requested data quality deteriorates. In addition, the P2P path, which is the alternative path, also includes the path 20 with reduced available network bandwidth, so that the requested data quality deteriorates. As such, when the current path and the alternative path share the path 20 with reduced available network bandwidth, there is no possibility of transmitting data of improved quality even when transmitting and receiving data through the alternative path, so steps for changing the network path are not performed, and the current path is maintained.

In some embodiments, when detailed information about a network connection relationship, in which a plurality of terminals and a relay server are connected, is not checked, and the requested data quality of the alternative path also deteriorates like the requested data quality of the current path, the path 20 with reduced available network bandwidth is assumed to be shared by the current path and the alternative path, and the current path may be maintained. According to the present embodiment, it is possible to determine whether to change the network path even when detailed information on the network connection relationship as shown in FIGS. 10 and 11 does not exist. It will be described again with reference to FIG. 6.

Referring to FIG. 6, if the data quality history information of the alternative path exists, the data quality history information of the alternative path has not expired because it has not elapsed more than a reference time (S320), and the requested data quality of the alternative path is higher than the requested data quality of the current path (S340), the network path is changed to the alternative path in step S350.

On the other hand, if the data quality history information of the alternative path exists, and the data quality history information of the alternative path has not expired because it has not elapsed more than the reference time (S320), and the requested data quality of the alternative path is lower than the requested data quality of the current path (S340), the network path is maintained as the current path in step S270.

Figure 12:
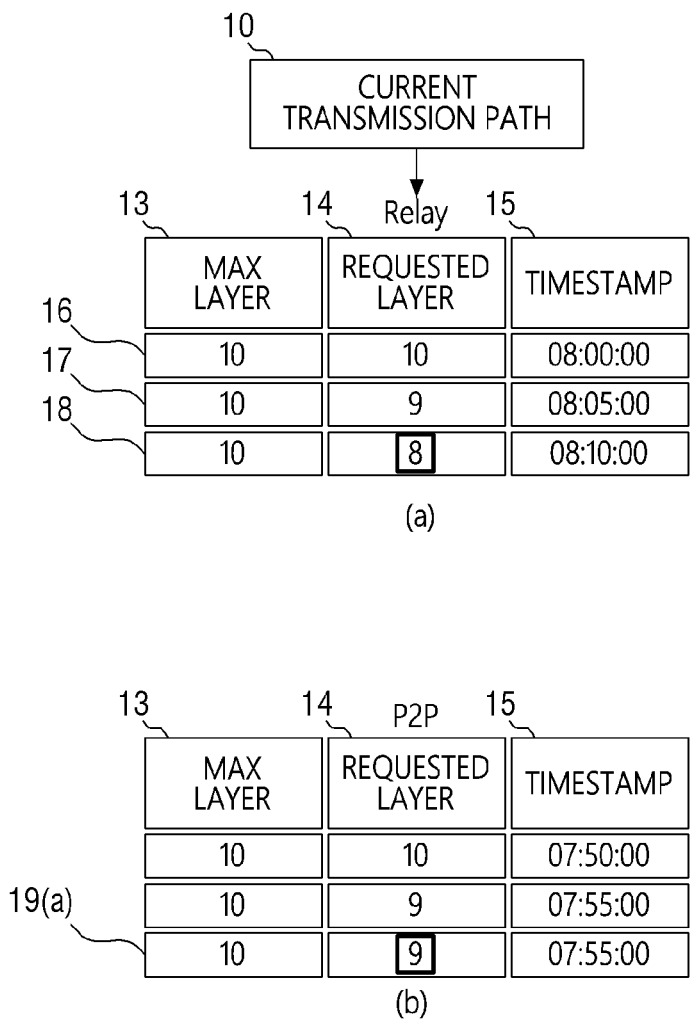
FIGS. 12 to 14 are diagrams for describing in more detail a network path change operation of the P2P connection control method described with reference to FIGS. 5 and 6.
Figure 13:
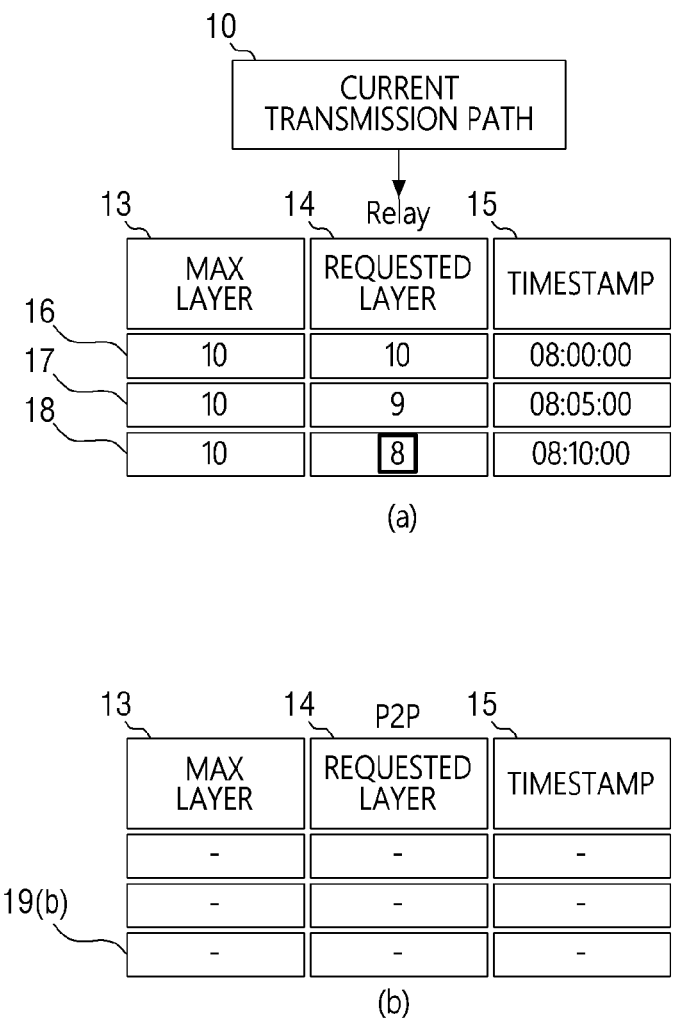
Figure 14:
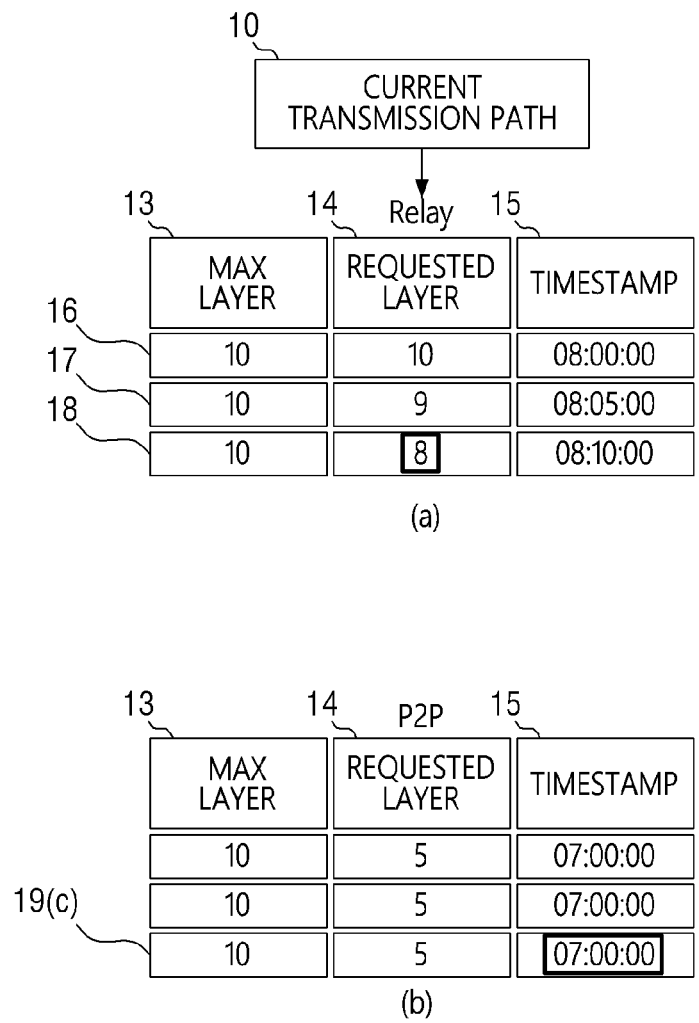

For a detailed description related thereto, it will be described with reference to FIG. 12. FIGS. 12 to 14 are diagrams for describing in more detail a network path change operation of the P2P connection control method described with reference to FIGS. 5 and 6.

Referring to (a) of FIG. 12, the data quality history information of the path via the server, which is the current path 10, is shown. Here, as described with reference to FIG. 9, the third time received data quality information 18 is a case, in which the difference between the highest data quality 13 and the requested data quality 14 is greater than or equal to a reference value, and steps for changing the network path are performed.

Referring to (b) of FIG. 12, the data quality history information of the P2P path, which is the alternative path, is shown. Here, the data quality history information of the P2P path includes the first data quality information 19(a). The first data quality information 19(a) is data quality information of the alternative path, and it is information that has not expired because it has not elapsed more than a reference time. In addition, since the requested data quality 14 included in the first data quality information 19(a) is higher than the requested data quality 14 included in the third time received data quality information 18 of the current path, the network path is changed to the P2P path. It will be described again with reference to FIG. 6.

Referring to FIG. 6, if the data quality history information of the alternative path does not exist (S320), the requested data quality of the alternative path is calculated in step S330. In addition, if the data quality history information of the alternative path exists but its period has expired (S320), the requested data quality of the alternative path is calculated in step S330 similarly. According to the present embodiment, when the data quality history information of the alternative path does not exist or the validity period of the data quality history information has expired and the requested data quality of the alternative path cannot be guaranteed, the requested data quality of the alternative path is newly calculated.

In step S330, the operation of calculating the request data quality of the alternative path is the same as the operation in step S220, except that the target network path is different. Also, the description of step S250 described above may be referenced. For a detailed description related thereto, it will be described with reference to FIGS. 13 and 14.

Referring to (a) of FIG. 13, data quality history information of a path via a server, which is the current path 10, is shown. Here, as described with reference to FIG. 9, the third time received data quality information 18 is a case, in which the difference between the highest data quality 13 and the requested data quality 14 is greater than or equal to a reference value, and steps for changing the network path are performed.

Referring to (b) of FIG. 13, data quality history information of the P2P path, which is the alternative path, is shown. Here, the data quality history information does not exist in the second data quality information 19(b). Therefore, the requested data quality of the alternative path should be calculated.

Referring to (a) of FIG. 14, data quality history information of the path via the server, which is the current path 10, is shown. Here, as described with reference to FIG. 9, the third time received data quality information 18 is a case, in which the difference between the highest data quality 13 and the requested data quality 14 is greater than or equal to a reference value, and steps for changing the network path are performed.

Referring to (b) of FIG. 14, data quality history information of the P2P path, which is the alternative path, is shown. Here, the data quality history information of the P2P path includes the third data quality information 19(c). The third data quality information 19(c) is data quality information of the alternative path, but it has elapsed more than a reference time and has expired. Therefore, the requested data quality of the alternative path should be calculated. It will be described again with reference to FIG. 6.

Next, in step S340, if the calculated request data quality of the alternative path is lower than the requested data quality of the current path (S340), the network path is maintained as the current path in step S270. On the other hand, if the requested data quality of the alternative path is higher than the requested data quality of the current path (S340), the network path is changed to the alternative path in step S350.

As described above, according to the present embodiment described with reference to FIGS. 5 to 14, a network path may be determined as a path capable of transmitting and receiving data of better quality among the current path and the alternative path. Also, according to the present embodiment, the specific criterion for changing the network path may be provided.

Hereinafter, an exemplary computing device 1500 that can implement an apparatus and a system, according to various embodiments of the present disclosure will be described with reference to FIG. 15.

Figure 15:
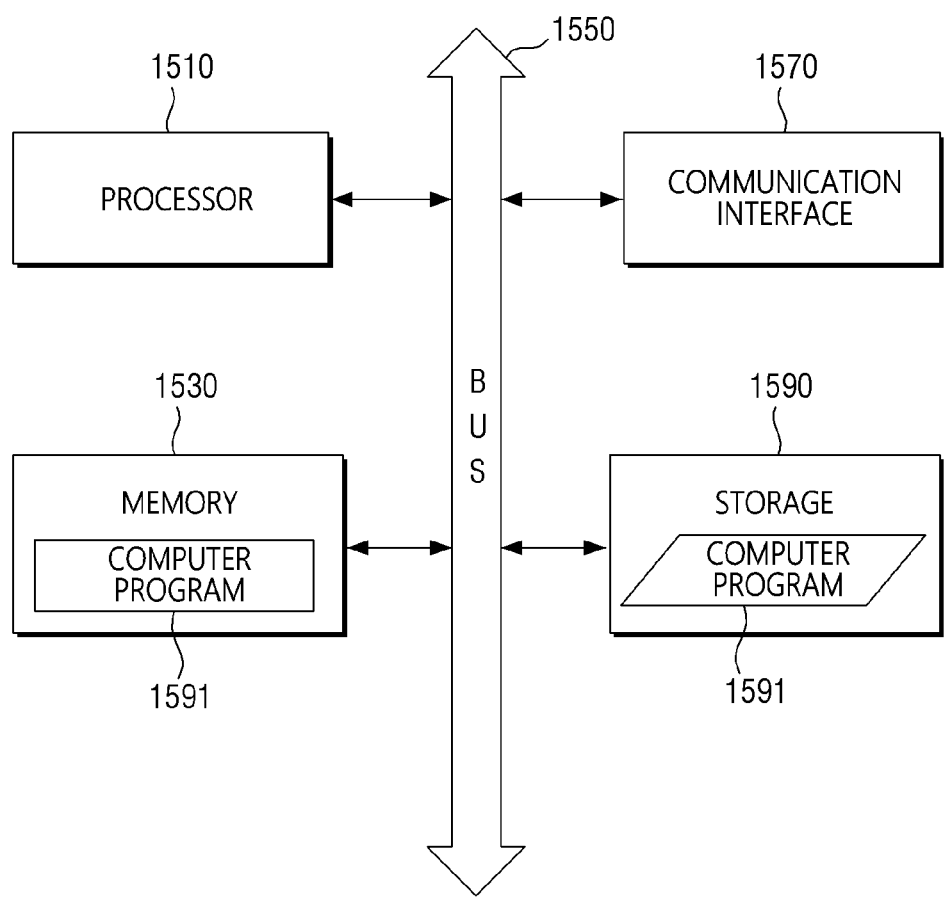
FIG. 15 is a hardware configuration diagram of an apparatus for controlling a P2P connection according to another embodiment of the present disclosure.

FIG. 15 is an example hardware diagram illustrating a computing device 1500.

As shown in FIG. 15, the computing device 1500 may include one or more processors 1510, a bus 1550, a communication interface 1570, a memory 1530, which loads a computer program 1591 executed by the processors 1510, and a storage 1590 for storing the computer program 1591. However, FIG. 15 illustrates only the components related to the embodiment of the present disclosure. Therefore, it will be appreciated by those skilled in the art that the present disclosure may further include other general purpose components in addition to the components shown in FIG. 15.

The processor 1510 controls overall operations of each component of the computing device 1500. The processor 1510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1510 may perform calculations on at least one application or program for executing a method/operation according to various embodiments of the present disclosure. The computing device 1500 may have one or more processors.

The memory 1530 stores various data, instructions and/or information. The memory 1530 may load one or more programs 1591 from the storage 1590 to execute methods/operations according to various embodiments of the present disclosure. For example, when the computer program 1591 is loaded into the memory 1530, the logic (or the module) as shown in FIG. 5 may be implemented on the memory 1530. An example of the memory 1530 may be a RAM, but is not limited thereto.

The bus 1550 provides communication between components of the computing device 1500. The bus 1550 may be implemented as various types of bus such as an address bus, a data bus and a control bus.

The communication interface 1570 supports wired and wireless internet communication of the computing device 1500. The communication interface 1570 may support various communication methods other than internet communication. To this end, the communication interface 1570 may be configured to comprise a communication module well known in the art of the present disclosure.

The storage 1590 can non-temporarily store one or more computer programs 1591. The storage 1590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1591 may include one or more instructions, on which the methods/operations according to various embodiments of the present disclosure are implemented. When the computer program 1591 is loaded on the memory 1530, the processor 1510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present inventive concept. Therefore, the disclosed preferred embodiments of the invention are used in a generic and descriptive sense only and not for purposes of limitation. The scope of protection of the present inventive concept should be interpreted by the following claims, and all technical ideas within the scope equivalent thereto should be construed as being included in the scope of the technical idea defined by the present disclosure.

What is claimed is:

1. A method performed by a computing device for controlling a P2P connection, the method comprising:
    obtaining network information of a current path for transmitting and receiving data;
    calculating requested data quality of the current path by using the network information; and
    changing a network path to an alternative path by using previously stored data quality history information of the alternative path when a difference between a predetermined highest data quality and the requested data quality of the current path is equal to or greater than a reference value,
    wherein the changing of the network path comprises,
    calculating requested data quality of the alternative path by using information on a verification packet received in real time through the alternative path when the data quality history information of the alternative path does not exist or the data quality history information of the alternative path is information that has elapsed more than a reference time; and
    changing the network path to the alternative path when the requested data quality of the alternative path is higher than the requested data quality of the current path.

2. The method of claim 1, wherein the data comprises video data of a user participating in a video conferencing service.

3. The method of claim 1, wherein the current path is any one of a P2P path and a path via a server, wherein the alternative path is the path via the server if the current path is the P2P path, and the alternative path is the P2P path if the current path is the path via the server.

4. The method of claim 1, wherein the calculating of the requested data quality of the current path comprises:
    calculating a packet loss rate and a delay time by using information on a packet included in the network information of the current path; and
    calculating an available bandwidth of the current path by using the packet loss rate and the delay time.

5. The method of claim 1, wherein the calculating of the requested data quality of the current path comprises:
    updating data quality history information of the current path by storing the calculated requested data quality of the current path to correspond to request time.

6. The method of claim 1, wherein the changing of the network path to the alternative path comprises:
    calculating requested data quality of the alternative path by using network information of the alternative path when the difference between the predetermined highest data quality and the requested data quality of the current path is equal to or greater than the reference value; and
    changing the network path to the alternative path when a difference between the requested data quality of the alternative path and the highest data quality is less than or equal to the reference value.

7. The method of claim 1, wherein the changing of the network path to the alternative path by using the previously stored data quality history information of the alternative path comprises:
    calculating requested data quality of the alternative path by using information on a verification packet received through the alternative path at every predetermined period; and
    updating the previously stored data quality history information of the alternative path by storing the calculated requested data quality of the alternative path to correspond to request time.

8. The method of claim 7, wherein the calculating of the requested data quality of the alternative path comprises:
    calculating a packet loss rate and a delay time by using information on the verification packet; and
    calculating an available bandwidth of the alternative path by using the packet loss rate and the delay time.

9. The method of claim 1, wherein the changing of the network path to the alternative path by using the previously stored data quality history information of the alternative path comprises:

changing the network path to the alternative path when requested data quality of the alternative path included in the data quality history information of the alternative path is higher than the requested data quality of the current path.

10. An apparatus for controlling a P2P connection, the apparatus comprising:
a processor;
a network interface;
a memory; and
a computer program loaded into the memory and executed by the processor, the computer program comprising:
an instruction for obtaining network information of a current path for transmitting and receiving data;
an instruction for calculating requested data quality of the current path by using the network information; and
an instruction for changing a network path to an alternative path by using previously stored data quality history information of the alternative path when a difference between predetermined highest data quality and the requested data quality of the current path is equal to or greater than a reference value,
wherein the instruction for changing of the network path includes,
calculating requested data quality of the alternative path by using information on a verification packet received in real time through the alternative path when the data quality history information of the alternative path does not exist or the data quality history information of the alternative path is information that has elapsed more than a reference time; and
changing the network path to the alternative path when the requested data quality of the alternative path is higher than the requested data quality of the current path.

11. The apparatus of claim 10, wherein the instruction for calculating the requested data quality of the current path comprises:
an instruction for calculating a packet loss rate and a delay time by using information on a packet included in the network information of the current path; and
an instruction for calculating an available bandwidth of the current path by using the packet loss rate and the delay time.

12. The apparatus of claim 10, wherein the instruction for calculating the requested data quality of the current path comprises:
an instruction for updating data quality history information of the current path by storing the calculated requested data quality of the current path to correspond to request time.

13. The apparatus of claim 10, wherein the computer program further comprises:
an instruction for calculating requested data quality of the alternative path by using information on a verification packet received through the alternative path at every predetermined period; and
an instruction for updating the previously stored data quality history information of the alternative path by storing the calculated requested data quality of the alternative path to correspond to request time.

14. The apparatus of claim 10, wherein the instruction for changing the network path to the alternative path by using the previously stored data quality history information of the alternative path comprises:
an instruction for changing the network path to the alternative path when requested data quality of the alternative path included in the data quality history information of the alternative path is higher than the requested data quality of the current path.

15. An apparatus for controlling a peer-to-peer (P2P) connection, the apparatus comprising:
a first network measurement module for collecting network information of a P2P path to a P2P connectable counterpart terminal;
a second network measurement module for collecting network information of a path via a server;
a data quality management module for calculating and storing data quality of the P2P path and the path via the server by using the network information obtained by the first network measurement module and the second network measurement module; and
a transmission path management module for determining a network path for transmitting and receiving data by using data quality history information stored in the data quality management module,
wherein the transmission path management module determines the network path as an alternative path by using requested data quality of the alternative path included in the data quality history information when a difference between requested data quality of the current path included in the data quality history information and predetermined highest data quality is equal to or greater than a reference value,
wherein the first network measurement module is configured to calculate requested data quality of the alternative path by using information on a verification packet received in real time through the alternative path when the data quality history information of the alternative path does not exist or the data quality history information of the alternative path is information that has elapsed more than a reference time,
wherein the transmission path management module is configured to change the network path to the alternative path when the requested data quality of the alternative path is higher than the requested data quality of the current path.

16. The apparatus of claim 15, wherein the transmission path management module determines the network path as the alternative path when the requested data quality of the alternative path is higher than the requested data quality of the current path.

17. The apparatus of claim 15, wherein the first network measurement module collects the network information at every predetermined first period; and
the second network measurement module collects the network information at every predetermined second period.

18. The apparatus of claim 17, wherein the first period is shorter than the second period if the current path is the P2P path, and the second period is shorter than the first period if the current path is the path via the server.

* * * * *